J. C. SMITH.
TOY.
APPLICATION FILED MAR. 28, 1910.
972,724.
Patented Oct. 11, 1910.
2 SHEETS—SHEET 1.
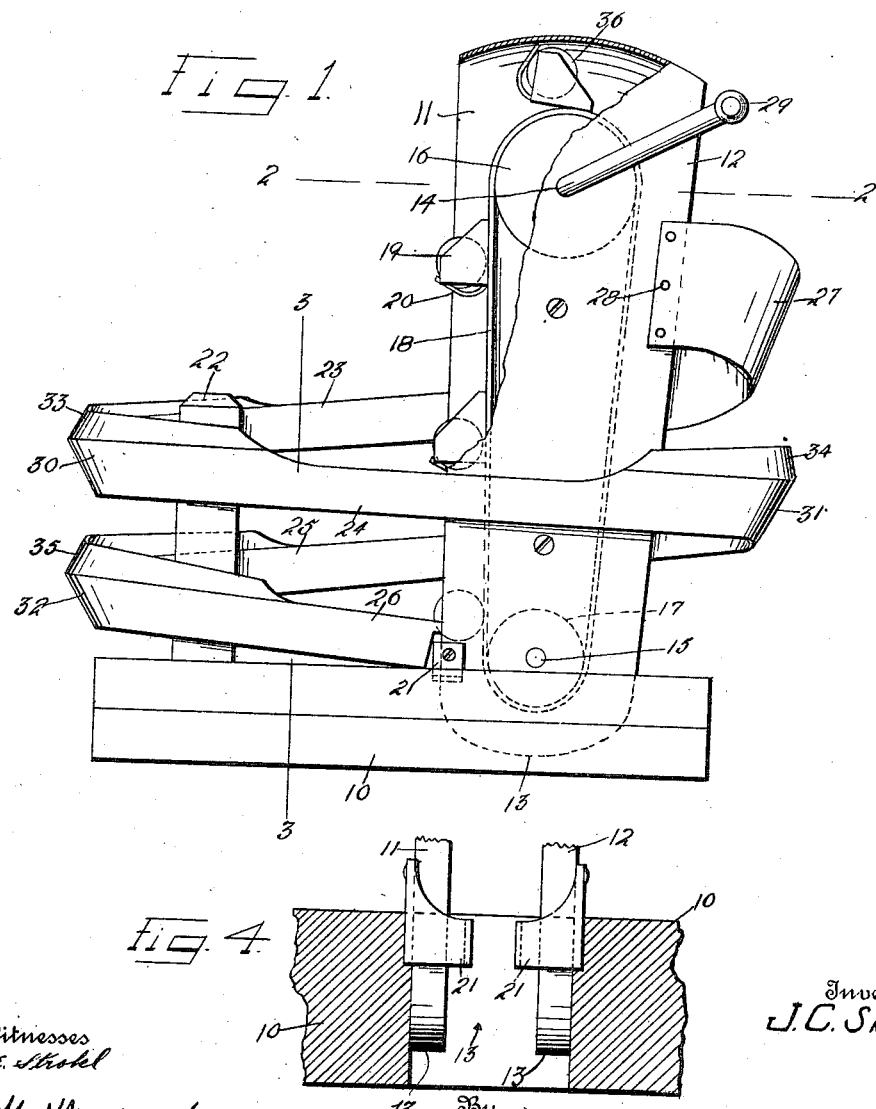
Witnesses
J. C. Strohl
C. N. Woodward
Inventor
J. C. Smith
By
Attorneys J. C. SMITH.
TOY.
APPLICATION FILED MAR. 28, 1910.
972,724.
Patented Oct. 11, 1910.
2 SHEETS—SHEET 2.
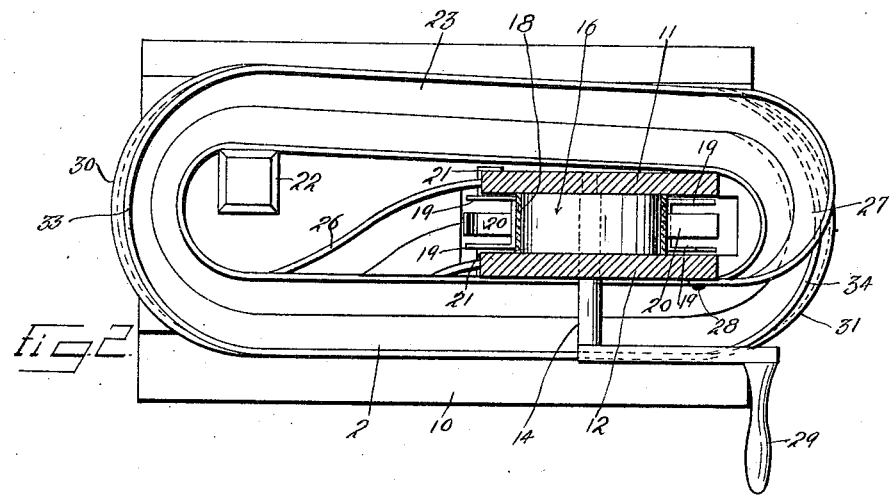
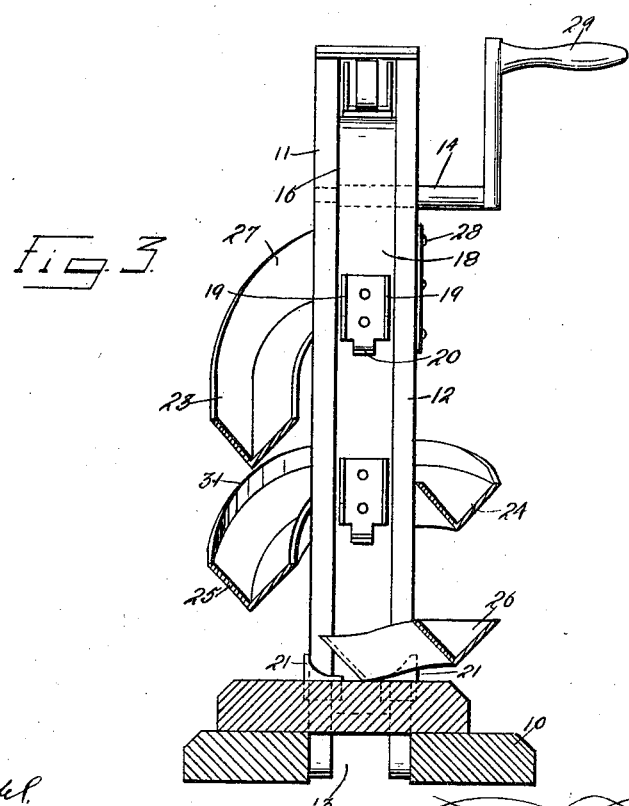
Witnesses
J. C. Strobel.
C. H. Woodward
Inventor
J. C. Smith
By Chandler & Chandler
Attorneys

UNITED STATES PATENT OFFICE.

JOHN C. SMITH, OF WASHINGTON, MISSOURI.

TOY.

972,724.  Specification of Letters Patent.  Patented Oct. 11, 1910.

Application filed March 28, 1910. Serial No. 551,982.

*To all whom it may concern:*

Be it known that I, JOHN C. SMITH, a citizen of the United States, residing at Washington, in the county of Franklin, State of Missouri, have invented certain new and useful Improvements in Toys; and I do hereby declare the following to be a full, clear, and exact description of the invention, such as will enable others skilled in the art to which it appertains to make and use the same.

This invention relates to toys, of the class wherein a plurality of marbles or balls are arranged to traverse over an inclined continuous chute, and has for one of its objects to simplify and improve the construction of devices of this character.

With this and other objects in view, the invention consists in certain novel features of construction as hereinafter shown and described and then specifically pointed out in the claims; and, in the drawings illustrative of the preferred embodiment of the invention, Figure 1 is a side elevation of the improved device, partly in section, Fig. 2 is a plan view with the elevator device in section on the line 2—2 of Fig. 1, Fig. 3 is a vertical sectional view on the line 3—3 of Fig. 1, Fig. 4 is a sectional detail illustrating the construction and arrangement of the ball stop device at the terminal of the chute.

The improved device comprises a platform or base 10 of any suitable construction and with vertical members 11—12 spaced apart and supported upon the base. The base is formed with a recess in which the lower ends of the members 11—12 are supported as indicated at 13. Extending through the members 11—12 near their upper ends is a shaft 14, while a similar shaft 15 extends through the members 11—12 near their lower ends. A belt pulley 16 is mounted upon the shaft 14, while a similar belt pulley 17 is mounted upon the shaft 15 between the members 11—12, the pulleys carrying an endless belt 18. The pulley 16 is preferably larger than the pulley 17, as shown, so that the downwardly moving side of the pulley is spaced farther from the rear end of the platform 10 than the upwardly moving side of the belt, the object to be hereinafter explained.

Connected to the belt 18 at suitable intervals are "bucket" or elevating devices, each preferably formed of a single strip of sheet metal and comprising spaced sides 19 and an outwardly directed bottom portion 20, the bottom portions 20 being in the form of hooks, as shown. Near their lower ends the members 11—12 are provided with inwardly directed stop devices 21 to catch the balls and retain them in position for the buckets 19—20 to engage them and carry them upward, as hereinafter explained.

A plurality of inclined chutes connected at their ends by curved portions are supported by the spaced members 11—12 and a post 22, the latter supported upon the base 10 and spaced from the members 11—12. Any required number of the inclined chutes may be employed, but for the purpose of illustration four of the chutes are shown at 23—24—25—26. The chute 23 is the uppermost one and is provided at its upper end with a curved section or chute 27 which is connected at one end at 28 to the member 12 and merges at the other end into the upper or higher end of the chute 23, and is located in position to receive the balls as they are delivered from the bucket members 19—20 when the belt 18 is rotated by a crank 29 connected to the shaft 15. The lower end of the chute 23 and the upper end of the chute 24 are connected by a curved chute portion 30, while the lower end of the chute 24 and the upper end of the chute 25 are connected by a similar curved chute portion 31. The lower end of the chute 25 and the upper end of the chute 26 are similarly coupled by a curved chute section 32. The lower end of the chute 26 is curved inwardly and terminates adjacent to the stop members 21, and is so associated with these stop members that the balls when rolling from the final chute 26 will be engaged by the stop members 21 and held in position to be caught by the buckets as they move around beneath the pulley 17, as hereinafter explained.

The side walls of the curved chute portion 21 are of sufficient height to prevent the balls from becoming displaced as they are delivered from the elevator device. The curved portions 30—31—32 are provided respectively with inwardly and upwardly directed curved extensions 33—34—35 to prevent the balls from being drawn from the chutes by the centrifugal force as they move from the straight portions of the chute into the curved portions, as hereinafter explained.

Any required number of the balls may be employed, and are indicated at 36, and are first placed in the chutes and permitted to run down until they arrange themselves one behind the other in the lower chute 26 with the first ball supported upon the stop members 21. Then as the belt 18 is rotated by power applied to the crank 29 the first bucket 19—20 which passes upwardly between the stop members 21 engages the lowermost ball and carries it upward and delivers it over the upper pulley 16 and into the first mentioned chute portion 27. In the meantime the remaining balls have moved downwardly by gravity and deposit the next ball in position to be engaged by the next bucket, and so on continuously, so that a stream of balls may be caused to flow through the chutes and over the elevating device. By this means the child is amused and interested and also instructed.

The improved device is simple in construction, and can be inexpensively manufactured of any suitable material. The base 10, the members 11—12 and the post 22 may be of wood, while the remaining parts will preferably be of metal except the belt 18 which will be of leather or like material, but it will be understood that it is not desired to limit the invention to any specific material from which to construct the same.

What is claimed is:—

1. A toy comprising a chute continuously inclined from end to end and formed of a plurality of straight sections and connecting curved sections, a plurality of balls movable in said chute, and an elevating device arranged to receive the balls at the lowest end of the chute and deliver them at the highest end of the same.

2. A toy comprising a chute continuously inclined from end to end and formed of a plurality of straight sections and connecting curved sections, an upwardly directed curved guard upon each of said curved chute sections, a plurality of balls movable in said chute, and an elevating device arranged to receive the balls at the lowest end of the chute and deliver them at the highest end of the same.

3. A toy comprising a base, a chute continuously inclined from end to end and formed of a plurality of straight sections and connecting curved sections and supported from said base, and an elevator device supported from said base and arranged to receive the balls at the lowest end of the chute and deliver them at the highest end of the same.

4. A toy comprising a base, spaced vertical members rising from said base, an endless belt operating between said vertical members, a plurality of elevating buckets spaced apart and carried by said belt, a chute continuously inclined from end to end and formed of a plurality of straight sections and connecting curved section, and a plurality of balls movable in said chute, said belt being arranged to receive said balls from the lowest end of the chute and deliver them to the same at the highest point thereof.

5. A toy comprising a base having a vertical aperture, spaced vertical members connected at their lower ends in said base aperture, an endless belt operating between said spaced members and provided with elevating buckets spaced apart, a chute continuously inclined from end to end and formed of a plurality of straight sections and connecting curved sections, a plurality of balls movable in said chute, and stop devices connected to said spaced members adjacent to the lower end of the belt and extending into the path of said balls to hold them in position to be engaged consecutively by the buckets.

In testimony whereof, I affix my signature, in presence of two witnesses.

JOHN C. SMITH.

Witnesses:
CHAS. MOHELSKY,
HENRY KANNE.